United States Patent [19]

Velasco et al.

[11] Patent Number: 5,227,582

[45] Date of Patent: Jul. 13, 1993

[54] VIDEO AMPLIFIER ASSEMBLY MOUNT

[75] Inventors: Daniel J. J. Velasco, Hudson; Dennis C. Robinson, Marlboro; Jeffrey P. Copeland, Holden; Ricardo L. Fernandez, Beverly, all of Mass.

[73] Assignee: Digital Equipment Corporation, Maynard, Mass.

[21] Appl. No.: 864,114

[22] Filed: Apr. 6, 1992

[51] Int. Cl.⁵ .............................................. H05K 9/00
[52] U.S. Cl. .................................... 174/35 R; 361/424
[58] Field of Search .................. 174/35 R, 35 MS, 51, 174/50, 50.54; 361/424; 248/225.31, 225.4, 226.3, 226.4, 226.5, 227, 310, 312, 312.1, 313, 314

[56] References Cited

U.S. PATENT DOCUMENTS

| | | | |
|---|---|---|---|
| 4,260,849 | 4/1981 | Kirby | 174/51 |
| 4,742,201 | 5/1988 | Nakano et al. | |
| 4,890,199 | 12/1989 | Beutler | 174/35 R |
| 4,901,205 | 2/1990 | Landis et al. | 174/35 R |
| 4,926,291 | 5/1990 | Sarraf | 361/384 |
| 5,067,041 | 11/1991 | Cooke et al. | 361/394 |

Primary Examiner—Leo P. Picard
Assistant Examiner—Bot Ledynh
Attorney, Agent, or Firm—Barry N. Young; Ronald C. Hudgens

[57] ABSTRACT

The disclosed invention relates to a video display system having a device for shielding electromagnetic radiation emitted from electrical wires which connect a video amplifier to a cathode ray tube. The device uses inexpensive unshielded wires which are recessed within a conductive shielding enclosure. The wires are connected to the cathode ray tube by a socket which is positioned at an access opening in the shielding enclosure. The invention further relates to a device for mounting a shielding enclosure to a base using tabs on the enclosure which are captured in an interference fit between the surface of the base and brackets coupled to the base.

10 Claims, 9 Drawing Sheets

VIDEO AMPLIFIER ASSEMBLY MOUNT

FIELD OF THE INVENTION

This invention relates to a device for shielding electromagnetic radiation within a video display system.

BACKGROUND OF THE INVENTION

Cathode ray tubes are used in a number of applications, including oscillography, computer data display, radar display, television, and electronic phototypesetting. Devices serving these application may be generally referred to as video display systems. Video display systems are also sources of electromagnetic radiation and typically must be shielded to reduce the emission of electromagnetic interference.

A cathode ray tube is driven by electrical signals which are generated by a video amplifier. These signals are carried from the video amplifier to the cathode ray tube by video amplifier wires. The voltage of the video amplifier signals may be at tens of kilovolts and the current at hundreds of thousands of microamperes. The video amplifier, and the video amplifier wires which carry these signals, emit electromagnetic radiation and must be shielded.

Electromagnetic radiation generated by the video amplifier is typically shielded by a conductive enclosure which surrounds the video amplifier. The enclosure is often formed from wire mesh or a metal casting. Because access to the enclosure must be provided to allow the placement of the video amplifier within the enclosure, the enclosure typically consists of multiple parts. One part may form a cavity into which the video amplifier is positioned, and another part may cover the cavity opening to complete the enclosure of the video amplifier.

The enclosure and video amplifier assembly must then be mechanically mounted to the video display system. To maintain the electromagnetic radiation shielding effectiveness of the enclosure, the enclosure must also be electrically connected to the shielding portion of the video display system. This mechanical and electrical mounting is often done by fastening the enclosure with numerous conductive fasteners to a conductive base plate. The fastening is often accomplished with metal screws or rivets, or by welding. These mounting methods are typically permanent, labor intensive, or both. Permanent mounting, such as by welding or riveting, prevents the servicing of the video amplifier after the video display system has been manufactured. Removable mounting, such as by sheet metal screws, is labor intensive and not well suited to an efficient manufacturing process.

Alternatively, the video amplifier enclosure may be mechanically mounted within the video display system without regard to electrical conductivity. This allows the enclosure to be mounted to a nonconductive portion of the video display system. The enclosure must then be electrically connected to the shielding portion of the video display system by a conductive member, such as a ribbon of braided wire. However, separate mechanical and electrical mounting of the video amplifier enclosure requires separate assembly steps. These additional assembly steps, which are typically performed manually, add to the time and cost to manufacture the video display system.

Video amplifier wires are commonly shielded by using shielded wire. Shielded wire typically includes a conductive core for carrying the signals, an insulating layer surrounding the conductive core, and a conductive shield surrounding the insulating layer. The conductive shield is often a weave of conductive wire which forms an encasing mesh around the insulating layer. Conductive foils and the like are also used for the conductive shield.

Shielded wire, while effective to shield electromagnetic radiation emitted by the signals in the wire, is bulkier and more expensive than unshielded wire. Shielded wire also increases the cost and complexity of the assembly process. The shielded wire is more difficult to handle than unshielded wire, and the shield of each wire must be attached so that it is electrically connected to the video amplifier shield.

Therefore, it is desirable to have an inexpensive device that can effectively shield electromagnetic interference emitted by video amplifier wires without requiring each video amplifier wire to be separately shielded. It is also desirable to incorporate this shielding function into the video amplifier shielding enclosure. Further, it is desirable to have an inexpensive device that can mechanically and electrically mount the shielding enclosure simply and inexpensively, and that the shielding enclosure be mountable without any tool or additional fasteners. It is further desirable to have a shielding enclosure formed from a single part for ease of manufacture and assembly.

SUMMARY OF THE INVENTION

The invention relates broadly to a video display system having a cathode ray tube, a video amplifier, and a conductive shielding enclosure containing the video amplifier. Unshielded wires carry signals generated by the video amplifier to the cathode ray tube, and are coupled to the cathode ray tube by a socket. The socket is positioned at an access opening in the enclosure such that the enclosure is effective to retard the propagation of electromagnetic radiation emitted from the wires and from the video amplifier. This shielding effect allows the use of unshielded wires between the video amplifier and the cathode ray tube.

Another aspect of the invention relates to an electromagnetic shielding assembly comprising a shielding enclosure and a base. Tabs on the shielding enclosure are captured in an interference fit, or a snug, frictional fit, between brackets coupled to the base and the major surface of the base. The interference fit is effective to mechanically and electrically connect the shielding enclosure to the base.

A further aspect of the invention relates to an electromagnetic shielding assembly comprising a shielding shell, which forms a cavity, and an electrically conductive base. Tabs on the shielding enclosure are captured in an interference fit between brackets coupled to the base and the major surface of the base. The interference fit is effective to mechanically and electrically connect the shielding enclosure to the base. The shielding shell and base assembly are effective to retard the propagation of electromagnetic radiation into or out from the cavity of the shielding shell.

These and other features and advantages of the present invention will become apparent from a reading of the detailed description in conjunction with the attached drawings.

DETAILED DESCRIPTION OF THE PREFERRED EMBODIMENT

Figure 1:
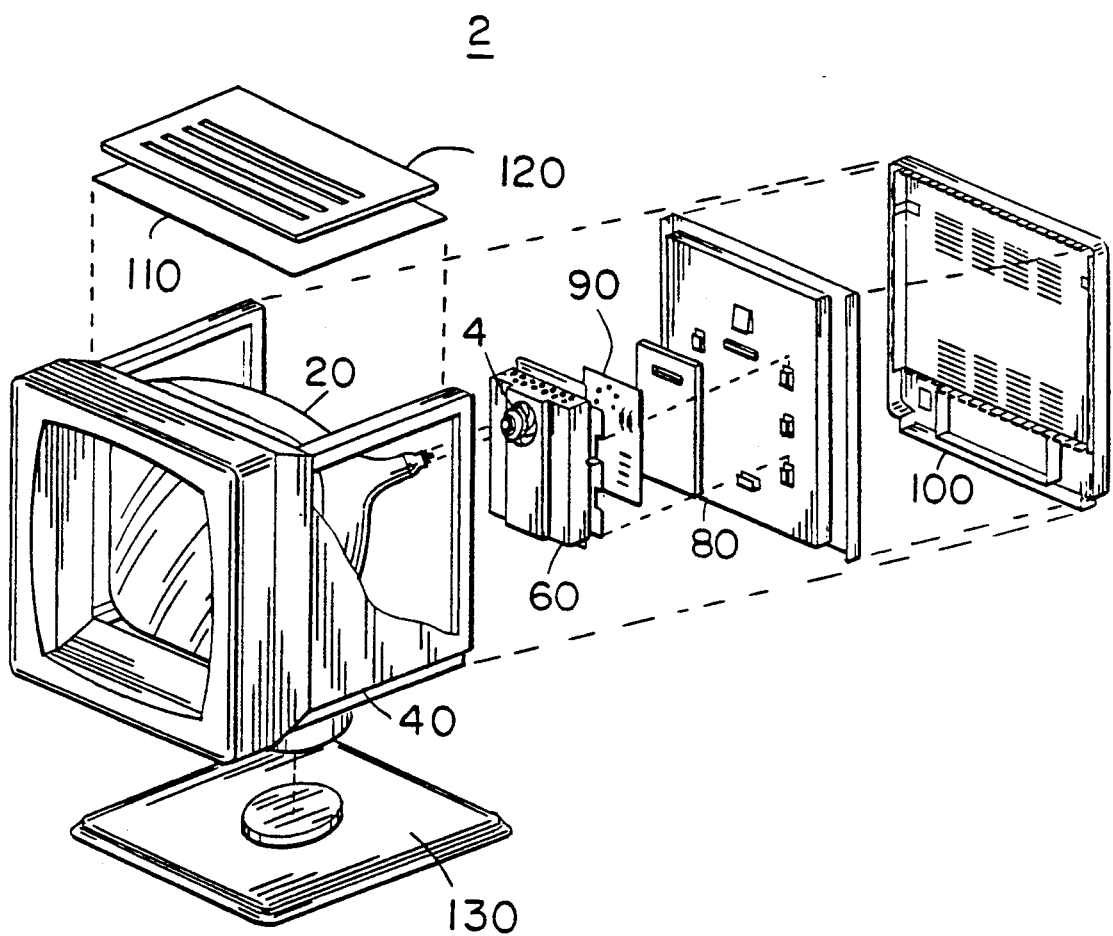
FIG. 1 is an exploded view of a video display system in accordance with the principles of the invention.

FIG. 1 shows an exploded view of a video display system 2. The video display system 2 includes a cathode ray tube 20 mounted inside a cabinet 40. The cathode ray tube 20 is coupled to a conventional video amplifier 90 by a socket 4. The video amplifier 90 is housed within a shielding enclosure 60, which is in turn mounted to a base 80. A cover 100 attaches to the cabinet 40, as does a shielding screen 110 and a slotted ventilation cover 120. The cabinet 40 is also mounted on a stand 130 to allow the cabinet to swivel.

The base 80 may be a mounting wall, a structural member of the cabinet 40, or any component of the video display system 2 which can provide a secure surface on which to mount the shielding enclosure 60. As shown, the base 80 is an electrically conductive mounting wall which provides electromagnetic shielding and serves as a safety barrier to prevent users from touching high voltage components, such as the video amplifier 90. In support thereof, the patent application Ser. No. 07/863,612 is hereby explicitly incorporated by reference.

Figure 2:
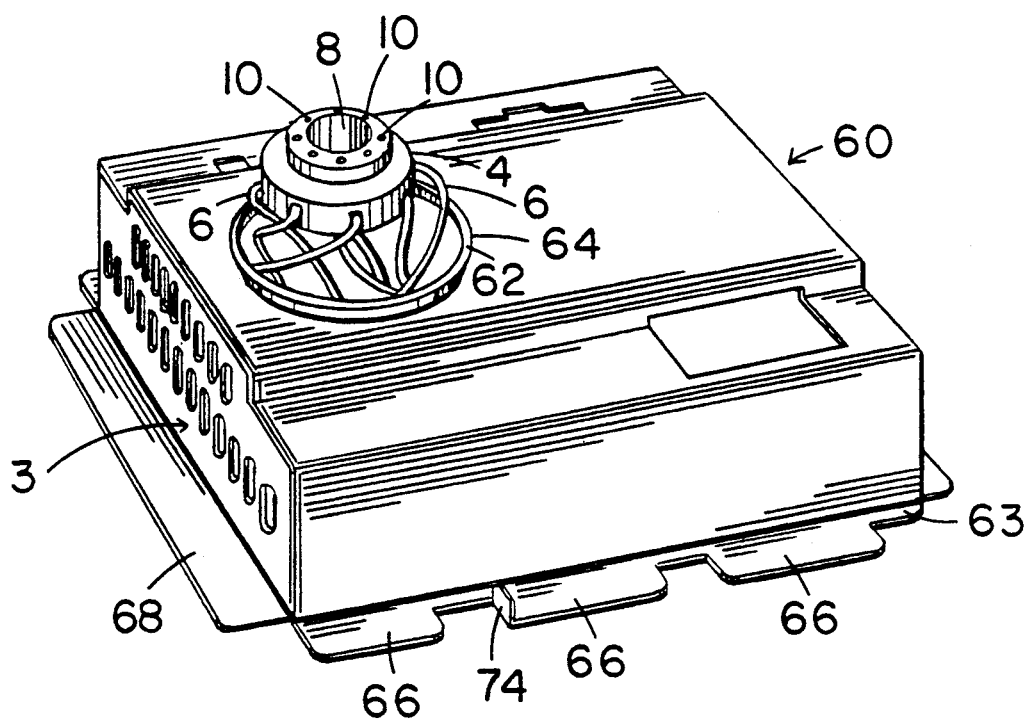
FIG. 2 is a perspective view of a shielding enclosure shown in FIG. 1 with a protruding socket and unshielded video amplifier wires.

FIG. 2 shows the shielding enclosure 60, which contains the video amplifier of FIG. 1. The shielding enclosure 60 is made from a conductive material so that the propagation of electromagnetic radiation emitted by the video amplifier is retarded. The shielding enclosure 60 may be formed from a metal casting, sheet metal, wire mesh, plastic with a conductive coating, or the like. The shielding enclosure 60 as shown in FIG. 2 was produced from a stamped and formed sheet of aluminum.

A socket 4 is connected to the video amplifier by unshielded video amplifier wires 6. The socket 4 has an alignment aperture 8, and a set of stem lead connectors 10. Each video amplifier wire 67 is electrically coupled to a stem lead connector 10 and to the video amplifier.

To allow access to the socket 4, an access opening 62 is provided in the shielding enclosure 60. As shown in FIG. 2, the socket 4 and the attached video amplifier wires 6 extend out of the shielding enclosure 60 through the access opening 62. A flange 64 is also shown surrounding the access opening 62.

Figure 3:
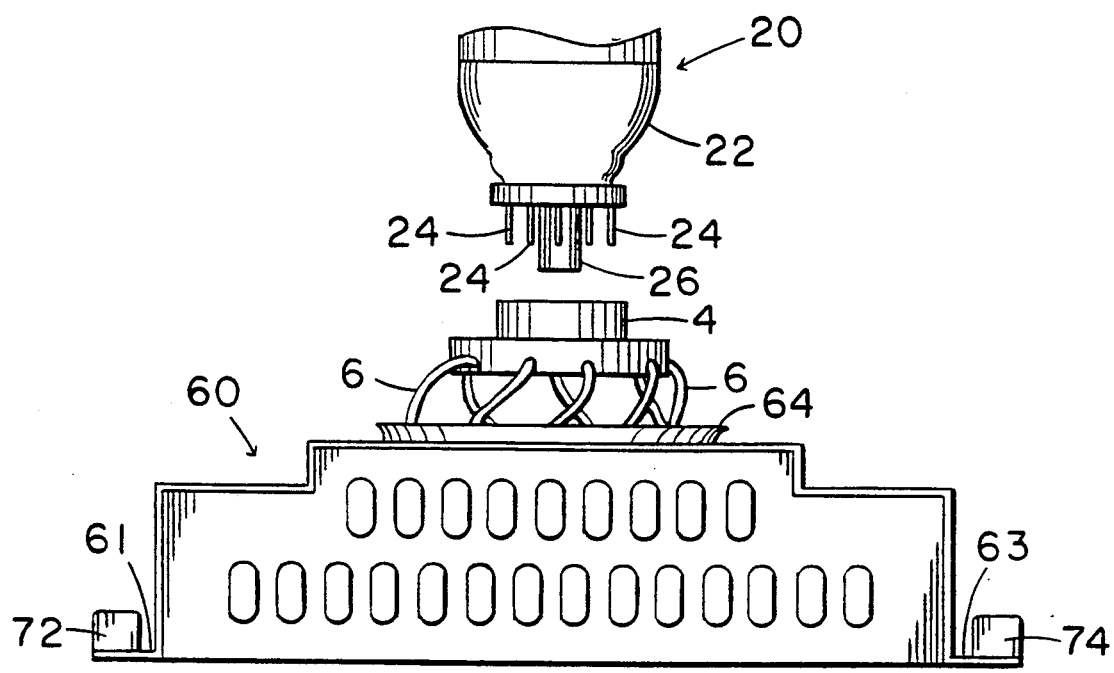
FIG. 3 is an elevation view of the shielding enclosure of FIG. 2 and a portion of a cathode ray tube of FIG. 1 positioned for assembly with the socket.

FIG. 3 shows the socket 4 and a portion of a cathode ray tube 20 positioned for assembly. The portion of the cathode ray tube 20 shown in FIG. 3 is the stem 22. Protruding from the stem 22 is a set of stem leads 24 which provide electrical connections to the interior of the cathode ray tube 20. Each stem lead 24 corresponds to a stem lead connector 10 (shown in FIG. 2). Also protruding from the stem 22 of the cathode ray tube 20 is an alignment plug 26.

As shown in FIG. 3, the socket 4 and the video amplifier wires 6 extend through the access opening 62 (shown in FIG. 2) and through the flange 64. Because the socket 4 is located outside of the shielding enclosure 60, the socket 4 is easily manipulated and positioned for assembly with the cathode ray tube 20. To position the socket 4 and the cathode ray tube 20 for assembly, the alignment plug 26 of the cathode ray tube 20 is aligned with the alignment aperture 8 (shown in FIG. 2) of the socket 4. The stem leads 24 are also aligned with their respective stem lead connectors 10.

Figure 4:
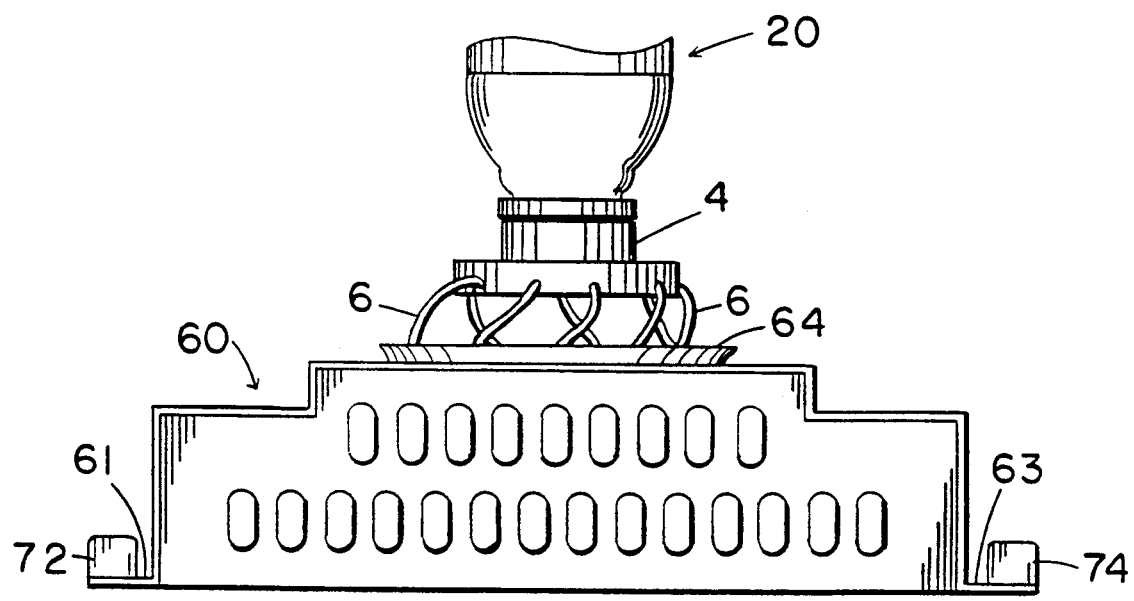
FIG. 4 is an elevation view of the shielding enclosure and the portion of the cathode ray tube of FIG. 3 assembled with the socket.

FIG. 4 shows the cathode ray tube 20 assembled with the socket 4. A portion of each unshielded video amplifier wire 6 is shown to extend outside of the shielding enclosure 60. The video signals carried by the video amplifier wires 6 generate electromagnetic radiation, which is thereby emitted by the video amplifier wires 6. The propagation of this electromagnetic radiation is retarded, however, where the shielding enclosure 60 blocks the path of propagation, absorbing or confining the electromagnetic radiation within the shielding enclosure 60. The shielding enclosure 60 is increasingly effective at retarding the propagation of electromagnetic radiation emitted by the video amplifier wires 6 as the length of video amplifier wires 6 outside of the shielding enclosure 60 is reduced. The video amplifier wires 6 shown in FIG. 4 are approximately two inches in length, with approximately one half inch of each video amplifier wire 6 extending beyond the flange 64 of the shielding enclosure 60.

Figure 5:
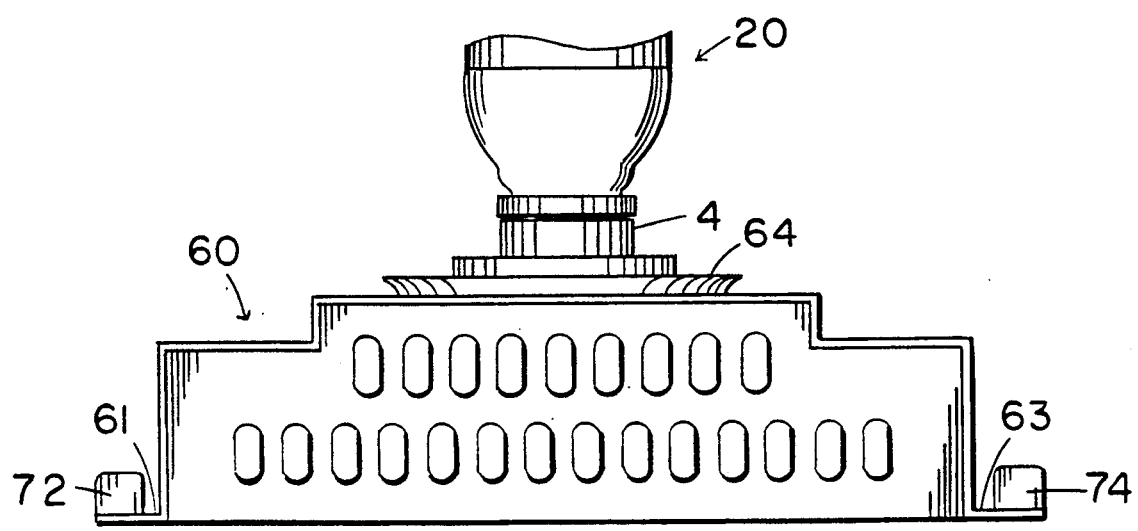
FIG. 5 is an elevation view of the cathode ray tube and connector assembly of FIG. 4 recessed within the opening of the shielding enclosure.

FIG. 5 shows the assembled cathode ray tube 20 and socket 4 of FIG. 4 recessed within the shielding enclosure 60. The shielding effectiveness of the shielding enclosure 60 is thereby increased by positioning all of the video amplifier wires 6 (shown in FIG. 4) within the shielding enclosure 60.

Alternatively, the shielding effectiveness of the shielding enclosure 60 may be increased by extending the flange 64 of the shielding enclosure 60. Extending the flange 64 to surround the portion of the video amplifier wires 6 which otherwise extend outside of the shielding enclosure 60 further retards the propagation of electromagnetic radiation emitted by the video amplifier wires 6.

Figure 6A:
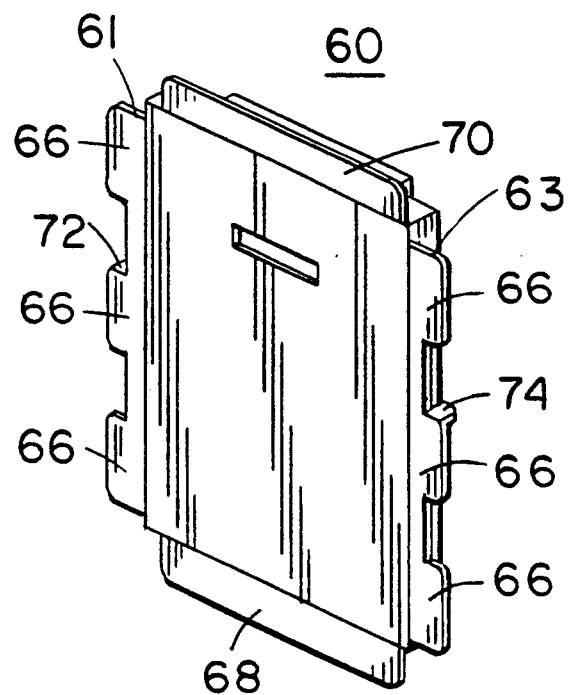
FIG. 6a is an isometric view of the back of the shielding enclosure shown in FIGS. 1 through 5.

FIG. 6a shows each of two opposing sides 61, 63 of the shielding enclosure 60 having three laterally extending side tabs 66. Any number of side tabs 66 may be used, provided that there is at least one side tab 66 per opposing side 61, 63 of the shielding enclosure. The shielding enclosure 60 may also have a leading tab 68. In addition, a trailing tab 70 may be coupled to the shielding enclosure 60. As shown, each opposing side 61, 63 of the shielding enclosure 60 has a side tab 66 coupled to a tab stop 72, 74. The tab stops 72, 74 are seen more clearly in FIG. 3.

Figure 6B:
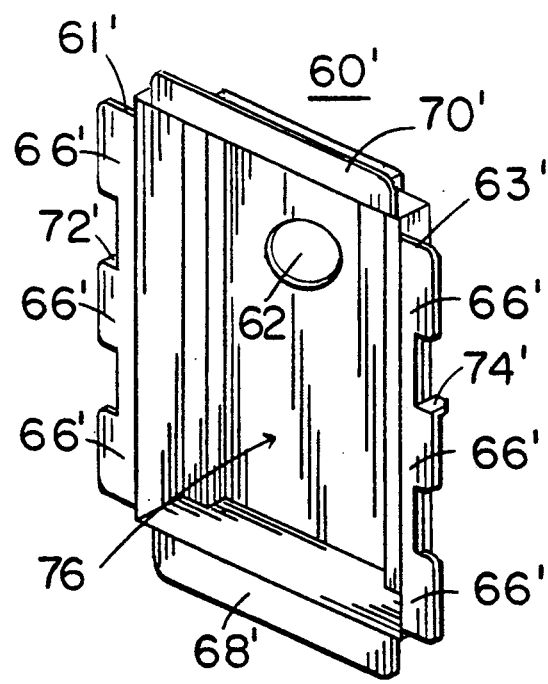
FIG. 6b is an isometric vie of the back of the shielding shell.

FIG. 6b shows a shielding shell 60' having a cavity 76 defined by the interior of the shielding shell 60'. Like the shielding enclosure 60, the shielding shell 60' is made from a conductive material. The shielding shell 60' may be formed from a metal casting, sheet metal, wire mesh, plastic with a conductive coating, or the like. The shielding shell 60' as shown in FIG. 6b was produced from a stamped and formed sheet of aluminum. The shielding shell 60' has side tabs 66', tab stops 72', 74', and leading and trailing tabs 68', 70' in analogous fashion to the shielding enclosure 60 of FIG. 6a.

Figure 7:
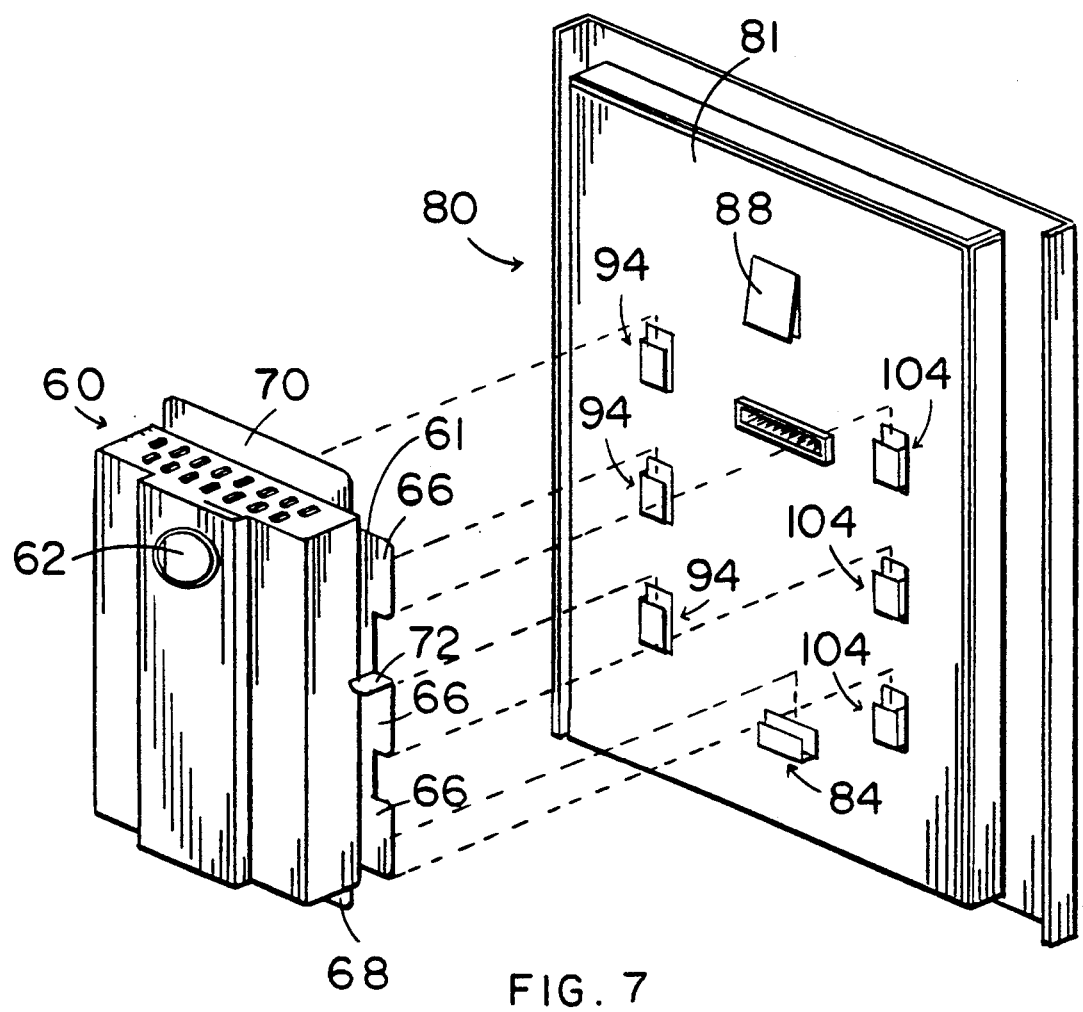
FIG. 7 is an exploded view of the shielding enclosure of FIGS. 1 through 6a and a base.
Figure 7A:
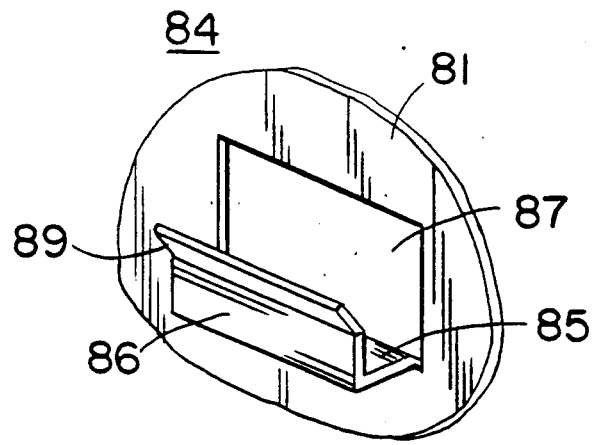
FIG. 7a is an isometric view of the leading edge bracket of FIG. 7.
Figure 7B:
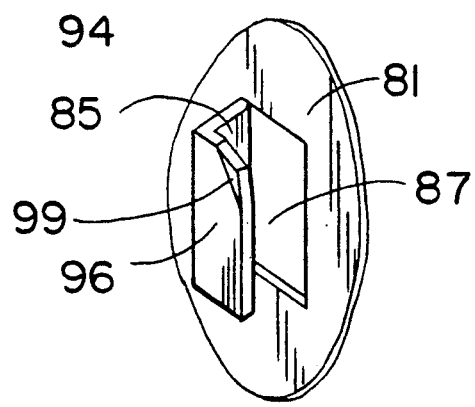
FIG. 7b is an isometric view of a side bracket of FIG. 7.
Figure 7C:
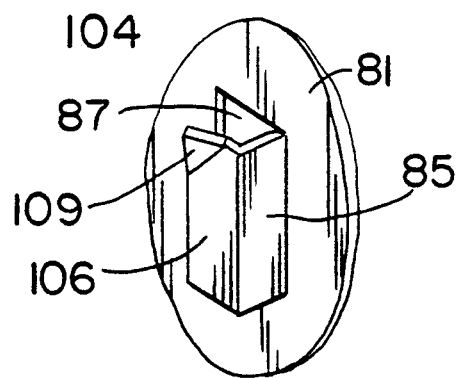
FIG. 7c is an isometric view of a side bracket of FIG. 7 which opposes the side bracket of FIG. 7b.

FIG. 7 shows the manner of assembling the shielding enclosure 60 to the base 80. The base 80 has one side bracket 94, 104 corresponding to each side tab 66 of the shielding enclosure 60, and a major surface 81. The base 80 also has a leading edge bracket 84 corresponding to the leading edge tab 68 of the shielding enclosure 60. As shown in FIG. 7a, the leading edge bracket 84 includes an upright member 85 and a contact member 86 normal thereto. FIG. 7b shows a side bracket 94 including an upright member 85 and a contact member 96 normal thereto. FIG. 7c shows a side bracket 104 including an upright member 85 and a contact member 106 normal thereto. As shown, the base 80 is formed from sheet metal, and the brackets 84, 94, 104 are formed from stamping and bending the sheet metal which forms the major surface 81 of the base 80. The stamping and bending process creates a bracket aperture 87 in the base 80 for each bracket 84, 94, 104 formed. The base 80 and brackets 84, 94, 104 may also be formed by casting, machining, or the like. Alternatively, the bracket may be formed separately from the base and joined during a subsequent manufacturing operation. The base 80 also has a locking flap 88.

The shielding enclosure 60 is positioned for assembly with the base 80 by locating the tabs 66, 68, 70 of the shielding enclosure 60 on the major surface 81 of the base 80. The shielding enclosure 60 is oriented such that the leading edge tab 68 is in opposition to the leading edge bracket 84 and such that each side tab 66 is adjacent to the corresponding side bracket 94, 104, as shown by the dashed assembly lines in FIG. 7.

The shielding enclosure 60 is then mounted to the base 80 by being translated along the major surface 81 of the base 80 such that the leading edge tab 68 is captured in an interference fit, or a snug, frictional fit, between the major surface 81 of the base 80 and the contact member 86 of the leading edge bracket 84. Each side tab 66 is similarly captured in an interference fit between the major surface 81 of the base 80 and the contact member 96, 106 of the corresponding side bracket 94, 104. The dashed assembly lines illustrate this translation in FIG. 7. To facilitate the assembly of the shielding enclosure 60 with the base 80, a corner portion 99, 109 nearest to the locking flap 88 of the contact member 96, 106 of each side bracket 94, 104 may be bent slightly in a direction away from the base 80, as shown in FIGS. 7b, and 7c. A bend of approximately 10 to 30 degrees from the major surface 81 of the base 80 is preferred. This forms a tapered gap between the major surface 81 of the base 80 and the contact member 96, 106 of each side bracket 94, 104. The contact member 86 of the leading edge bracket 84 may also have a bent portion 89. The bent portion 89 is the portion of the contact member 86 of the leading edge bracket 84 which is nearest to the locking flap 88. This bent portion 89 may be bent slightly in a direction away from the base 80, as shown in FIG. 7a. A bend of approximately 10 to 30 degrees from the major surface 81 of the base 80 is preferred. This forms a tapered gap between the major surface 81 of the base 80 and the contact member 86 of the leading edge bracket 84.

Figure 8:
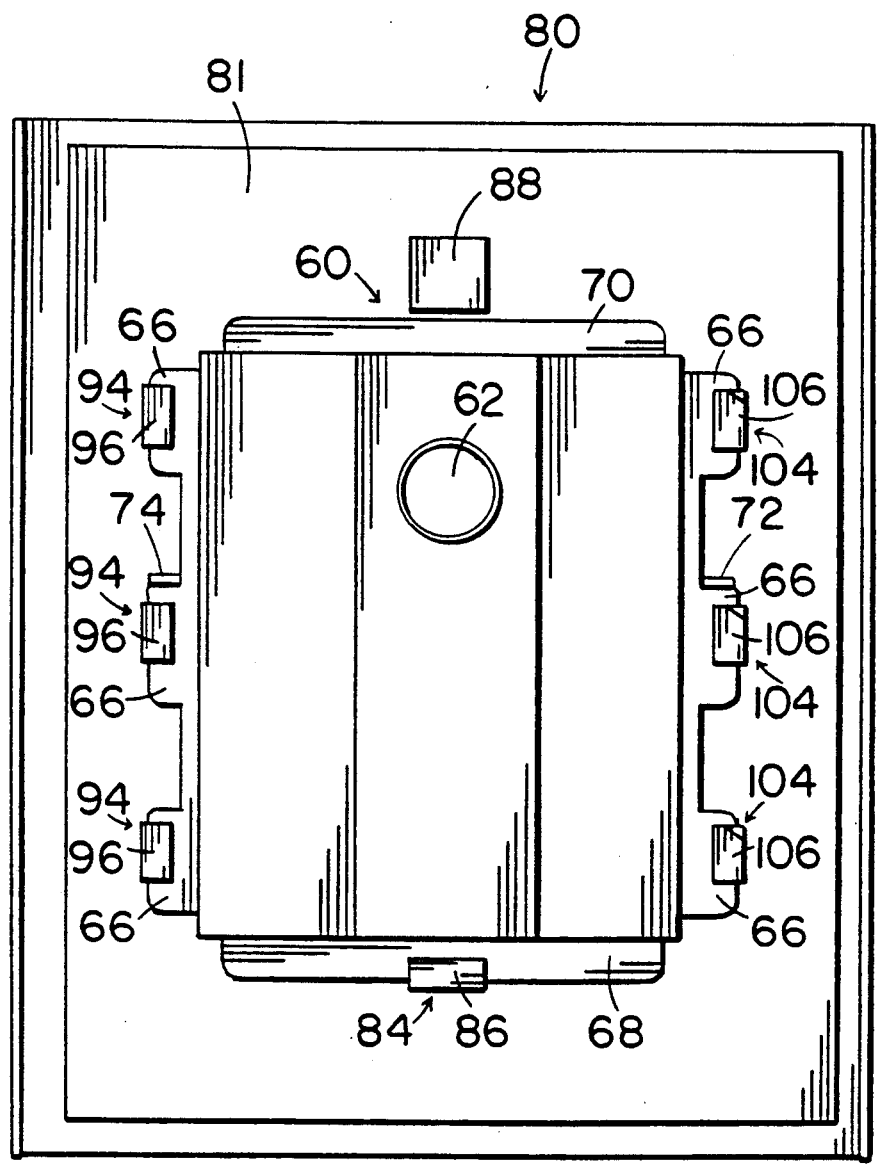
FIG. 8 is a plan view of the conductive shielding enclosure of FIG. 2 assembled with the base of FIG. 7.

FIG. 8 shows the shielding enclosure 60 assembled with the base 80. As shown, each side tab 66 is in an interference fit between the major surface 81 of the base 80 and the contact member 96, 106 of the corresponding side bracket 94, 104. The leading edge tab 68 is also in an interference fit between the major surface 81 of the base 80 and the contact member 86 of the leading edge bracket 84.

The capture of the tabs 66, 68 by the brackets 84, 94, 104 provide sufficient holding force to maintain the position of the shielding enclosure 60 on the base 80. However, a locking flap 88 may also be used to positively lock the shielding enclosure 60 in place. The locking flap 88 insures insure that the tabs 66, 68 are not dislodged from the brackets 84, 94, 104 by a shock, such as that generated by the dropping of the video display system 2. As shown, the shielding enclosure 60 has a trailing edge tab 70 which is engaged by a locking flap 88 of the base 80. Similarly, the shielding enclosure 60 may be positively locked in place by a screw or other fastener which engages both the shielding enclosure 60 and the base 80. Such a fastener may be captured in the base 80 so that it remains coupled to the base 80 while the shielding enclosure 60 is disassembled from the base 80. Other locking or fastening devices are equally suitable.

The shielding enclosure 60 is disassembled from the base 80 by depressing the locking flap 88 so that it no longer engages the trailing edge tab 70. The shielding enclosure 60 may then be translated along the major surface 81 of the base 80 so as to disengage the leading edge tab 68 from the leading edge bracket 84. This translation also disengages each side tab 66 from the corresponding side brackets 94, 104. The tab stops 72, 74 are effective to limit the translation of the enclosure 60 during disassembly by contacting the two side brackets 94, 104 which are the closest to the locking flap 88. The shielding enclosure 60 may thereby be assembled and disassembled from the base 80 without tools.

To maintain the electromagnetic radiation shielding effectiveness of the shielding enclosure 60, a low resistance electrical connection must be made to the shielding enclosure 60. Where the base 80 is formed from a conductive material, as shown in FIG. 8, an electrical connection is provided by the interference contact of each tab 66, 68 with the major surface 81 of the base and with the contact member 86, 96, 106 of the corresponding bracket 84, 94, 104. An electrical connection may also be provided between the trailing edge tab 70 and the major surface 81 of the base 80. Lowering the resistance of the electrical contact with the shielding enclosure 60 can increase the shielding effectiveness for higher frequency electromagnetic radiation. This may be done by increasing the contact area, such as by increasing the dimensions of the tabs 66, 68, 70 and of the brackets 84, 94, 104.

Where the base 80 is formed from a nonconductive material, the brackets 84, 94, 104 may be formed from a conductive material and joined to the base 80. The electrical connection to the shielding enclosure 60 is then made by the interference contact of each tab 66, 68 and the contact member 86, 96, 106 of the corresponding bracket 84, 94, 104.

The base 80, being formed from a conductive material, may also serve as an electromagnetic radiation shield to be effective as shield, however, the bracket apertures 87 of the base 80 must be blocked by a conductive material electrically connected to the base 80 so as retard the propagation of electromagnetic radiation through the bracket apertures 87. As shown in FIG. 8, each tab 66, 68 is effective to block the bracket aperture 87 of the corresponding bracket 84, 94, 104. Further, the interference contact of each tab 66, 68 with the major surface 81 of the base 80 and with the contact member 86, 96, 106 of the corresponding bracket 84, 94, 104 is effective to join the tabs 66, 68 and the base 80 in electrically conductive fashion.

A shielding shell 60', shown in FIG. 6b, may be assembled and disassembled with the base 80 in an analogous manner to the assembly and disassembly of the shielding enclosure 60. FIGS. 7, 7a, and 8, previously described in detail with reference to the shielding enclosure 60, are equally applicable with reference to the shielding shell 60'.

Using a shielding shell 60' allows easy access to the contents of the cavity 76 without the use of tools, fasteners, or moving parts. When assembled together, the shielding shell 60' and the conductive base 80 enclose the cavity 76 and any contents within the cavity 76. Once mounted on the base 80, the shielding shell 60' is effectively a one piece enclosure which replaces other enclosures which must be formed from multiple parts to allow access to the enclosure contents.

The shielding shell 60' and base 80 assembly, being electrically connected, thereby retard the propagation of electromagnetic radiation emitted by an electromagnetic radiation source, such as a video amplifier (not shown) within the cavity 76. The shielding shell 60' and base 80 assembly is similarly effective to retard the propagation of electromagnetic radiation from an outside electromagnetic radiation source (not shown) into the cavity 76.

While specific embodiments of the invention have been shown and described in detail to illustrate the application of the invention principles, it will be apparent that the invention may be embodied otherwise without deviating from the invention set forth in the following claims.

What is claimed is:

1. An electromagnetic shielding assembly comprising:
    an electrically conductive shielding enclosure comprising two opposing sides, each side having at least a laterally extending side tab, the shielding enclosure being effective to retard the propagation of electromagnetic radiation between the interior and the exterior of the shielding enclosure;
    a base having a major surface and comprising two opposing spaced apart side brackets, each side bracket being electrically conductive and including an upright member extending from the major surface of the base and a contact member coupled to the upright member, the contact member being spaced apart from and generally parallel to the major surface of the base, each side tab being captured in an interference fit between the major surface of the base and the contact member of the corresponding side bracket when the side tabs are engaged with their corresponding side brackets, each side tab being in electrical contact with the contact member of the corresponding side bracket.

2. The shielding assembly of claim 1 further comprising a tab stop, the tab stop being coupled to and being normal to one of the side tabs, the tab stop being effective to limit the translation of the shielding enclosure along the major surface of the base by contacting one of the side brackets of the base.

3. The shielding assembly of claim 1 further comprising fastening means for preventing the translation of the shielding enclosure along the major surface of the base such that each tab remains in an interference fit between the major surface of the base and the contact member of the corresponding bracket, the fastening means being spaced apart from and in opposition in the leading edge bracket.

4. The shielding assembly of claim 3 wherein each of the two opposing sides of the shielding enclosure has three laterally extending side tabs.

5. The shielding assembly of claim 3 wherein the contact member of each of the side brackets has a corner portion facing the fastening means, the corner portion being slightly bent outwardly from the major surface of the base, and wherein the contact member of the leading edge bracket has a bent portion, the bent portion being bent slightly outwardly from the major surface of the base.

6. An electromagnetic shielding assembly comprising:
    an electrically conductive shielding shell, forming a cavity, comprising two opposing sides, each side having at least a laterally extending side tab;
    an electrically conductive base having a major surface and comprising two opposing spaced apart side brackets, each side bracket including an upright member extending from the major surface of the base and a contact member coupled to the upright member, the contact member being spaced apart from and generally parallel to the major surface of the base, each side tab being captured in an electrically conductive interference fit between the major surface of the base and the contact member of the corresponding side bracket when the side tabs are engaged with their corresponding side brackets, the shielding shell and base being effective to substantially enclose the cavity and being effective to retard the propagation of electromagnetic radiation between the cavity and the exterior of the shielding assembly.

7. The shielding assembly of claim 6 further comprising a tab stop, the tab stop being coupled to and being normal to one of the side tabs, the tab stop being effective to limit the translation of the shielding shell along the major surface of the base by contacting one of the side brackets of the base.

8. The shielding assembly of claim 6 further comprising fastening means for preventing the translation of the shielding shell along the major surface of the base such that each tab remains in an interference fit between the major surface of the base and the contact member of the corresponding bracket, the fastening means being spaced apart from and in opposition to the leading edge bracket.

9. The shielding assembly of claim 8 wherein each of the two opposing sides of the shielding shell has three laterally extending side tabs.

10. The shielding assembly of claim 8 wherein the contact member of each of the side brackets has a corner portion facing the fastening means, the corner portion being slightly bent outwardly from the major surface of the base, and wherein the contact member of the leading edge bracket has a bent portion, the bent portion being bent slightly outwardly from the major surface of the base.

* * * * *